United States Patent
Shah et al.

(10) Patent No.: US 6,205,813 B1
(45) Date of Patent: Mar. 27, 2001

(54) CRYOGENIC RECTIFICATION SYSTEM FOR PRODUCING FUEL AND HIGH PURITY METHANE

(75) Inventors: Minish Mahendra Shah, East Amherst; James Joseph Maloney, Amherst; Raymond Francis Drnevich, Clarence Center, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/345,422

(22) Filed: Jul. 1, 1999

(51) Int. Cl.[7] .................................................. F25J 3/00
(52) U.S. Cl. .................. 62/630; 62/620; 62/624
(58) Field of Search ..................... 62/620, 624, 630

(56) References Cited

U.S. PATENT DOCUMENTS

| | | | |
|---|---|---|---|
| 4,311,496 | * 1/1982 | Fabian | 62/630 |
| 4,352,685 | 10/1982 | Swallow | 62/28 |
| 4,415,345 | 11/1983 | Swallow | 62/28 |
| 4,501,600 | 2/1985 | Pahade | 62/28 |
| 4,592,767 | 6/1986 | Pahade et al. | 62/31 |
| 4,664,686 | 5/1987 | Pahade et al. | 62/24 |
| 4,710,212 | * 12/1987 | Hanson et al. | 62/630 |
| 4,761,167 | 8/1988 | Nicholas et al. | 62/17 |
| 4,805,413 | * 2/1989 | Mitchell et al. | 62/630 |
| 4,878,932 | 11/1989 | Pahade et al. | 62/24 |
| 5,026,408 | 6/1991 | Saunders et al. | 62/24 |
| 5,041,149 | 8/1991 | Handley | 62/27 |
| 5,588,308 | * 12/1996 | Daugherty | 62/622 |
| 5,647,227 | 7/1997 | Lokhandwala | 62/624 |

FOREIGN PATENT DOCUMENTS 2122707 10/1972 (DE).
2208699 4/1989 (GB).

* cited by examiner

Primary Examiner—William Doerrler
(74) Attorney, Agent, or Firm—Donald T. Black

(57) ABSTRACT

A natural gas purification system which can produce both fuel and high purity hydrocarbon product such as high purity methane or high purity natural gas wherein high temperature carbon dioxide removal is followed by cryogenic rectification to produce fuel and high purity hydrocarbon product.

10 Claims, 3 Drawing Sheets

US 6,205,813 B1

CRYOGENIC RECTIFICATION SYSTEM FOR PRODUCING FUEL AND HIGH PURITY METHANE

TECHNICAL FIELD

This invention relates generally to cryogenic rectification and, more particularly, to cryogenic rectification in the purification of natural gas.

BACKGROUND ART

In the production of natural gas it is sometimes necessary to subject the raw natural gas stream to a purification process in order to produce natural gas with a sufficient combustibles content so that it may be efficiently used within a natural gas distribution network such as a pipeline system. A number of such natural gas purification systems are known and practiced commercially.

Methane, the main component of natural gas, is widely used as a chemical synthesis feedstock. As such, the methane must be of a high purity to ensure effective downstream synthesis. It would be highly desirable to produce high purity methane, suitable for use in subsequent chemical synthesis reactions, in conjunction with natural gas purification.

Accordingly, it is an object of this invention to provide a system which can process a raw natural gas feed stream and produce both fuel and high purity methane.

Conventional natural gas purification systems which process a nitrogen-containing raw natural gas stream typically produce pipeline quality natural gas having a significant nitrogen content such as up to five mole percent or more. While this is acceptable for most uses of the natural gas, such a nitrogen content cannot be tolerated in some applications, such as in certain metallurgical processes where nitrogen can cause detriment to the metal. Accordingly, it is another object of this invention to provide a system which can process a raw natural gas feed stream and produce both fuel and high purity natural gas.

SUMMARY OF THE INVENTION

The above and other objects, which will become apparent to those skilled in the art upon a reading of this disclosure, are attained by the present invention, one aspect of which is:

A process for the production of fuel and high purity hydrocarbon product comprising:

(A) providing a feed comprising nitrogen, methane and carbon dioxide wherein carbon dioxide comprises from 1 to 40 volume percent of the feed;

(B) removing carbon dioxide from the feed to produce a carbon dioxide depleted feed;

(C) cooling the carbon dioxide depleted feed and passing the cooled carbon dioxide depleted feed into a cryogenic rectification column;

(D) separating the carbon dioxide depleted feed by cryogenic rectification within the cryogenic rectification column into fuel and high purity hydrocarbon product; and (E) recovering fuel from the upper portion of the cryogenic rectification column, and recovering high purity hydrocarbon product from the lower portion of the cryogenic rectification column.

Another aspect of the invention is:

Apparatus for the production of fuel and high purity hydrocarbon product comprising:

(A) a carbon dioxide removal system and means for providing a feed comprising nitrogen, methane and carbon dioxide to the carbon dioxide removal system;

(B) heat exchange means, and means for passing carbon dioxide depleted feed from the carbon dioxide removal system to the heat exchange means;

(C) a cryogenic rectification column and means for passing carbon dioxide depleted feed from the heat exchange means to the cryogenic rectification column;

(D) means for recovering fuel from the upper portion of the cryogenic rectification column; and (E) means for recovering high purity hydrocarbon product from the lower portion of the cryogenic rectification column.

As used herein, the term "column" means a distillation or fractionation column or zone, i.e. a contacting column or zone wherein liquid and vapor phases as countercurrently contacted to effect separation of a fluid mixture, as for example, by contacting or the vapor and liquid phases on a series of vertically spaced trays or plates mounted within the column and/or on packing elements such as structured or random packing. For a further discussion of distillation columns, see the Chemical Engineer's Handbook fifth edition, edited by R. H. Perry and C. H. Chilton, McGraw-Hill Book Company, New York, Section 13, *The Continuous Distillation Process*. Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluids into heat exchange relation without any physical contact or intermixing of the fluids with each other.

As used herein, the terms "upper portion" and "lower portion" mean those sections of a column respectively above and below the mid point of the column.

As used herein, the term "fuel" means a fluid containing from 15 to 40 volume percent methane.

As used herein, the term "high purity methane" means a fluid containing at least 99 volume percent methane, less than 0.5 mole percent nitrogen and less than 0.5 mole percent heavier hydrocarbons.

As used herein, the term "high purity natural gas" means a fluid comprised essentially of hydrocarbons, such as methane and heavier hydrocarbons, and containing no more than 200 ppm nitrogen, preferably no more than 50 ppm nitrogen.

As used herein, the term "high purity hydrocarbon product" means either high purity methane or high purity natural gas.

As used herein, the term "top condenser" means a heat exchange device that generates column downflow liquid from column vapor.

As used herein, the term "bottom reboiler" means a heat exchange device that generates column upflow vapor from column liquid.

DETAILED DESCRIPTION

Figure 1:
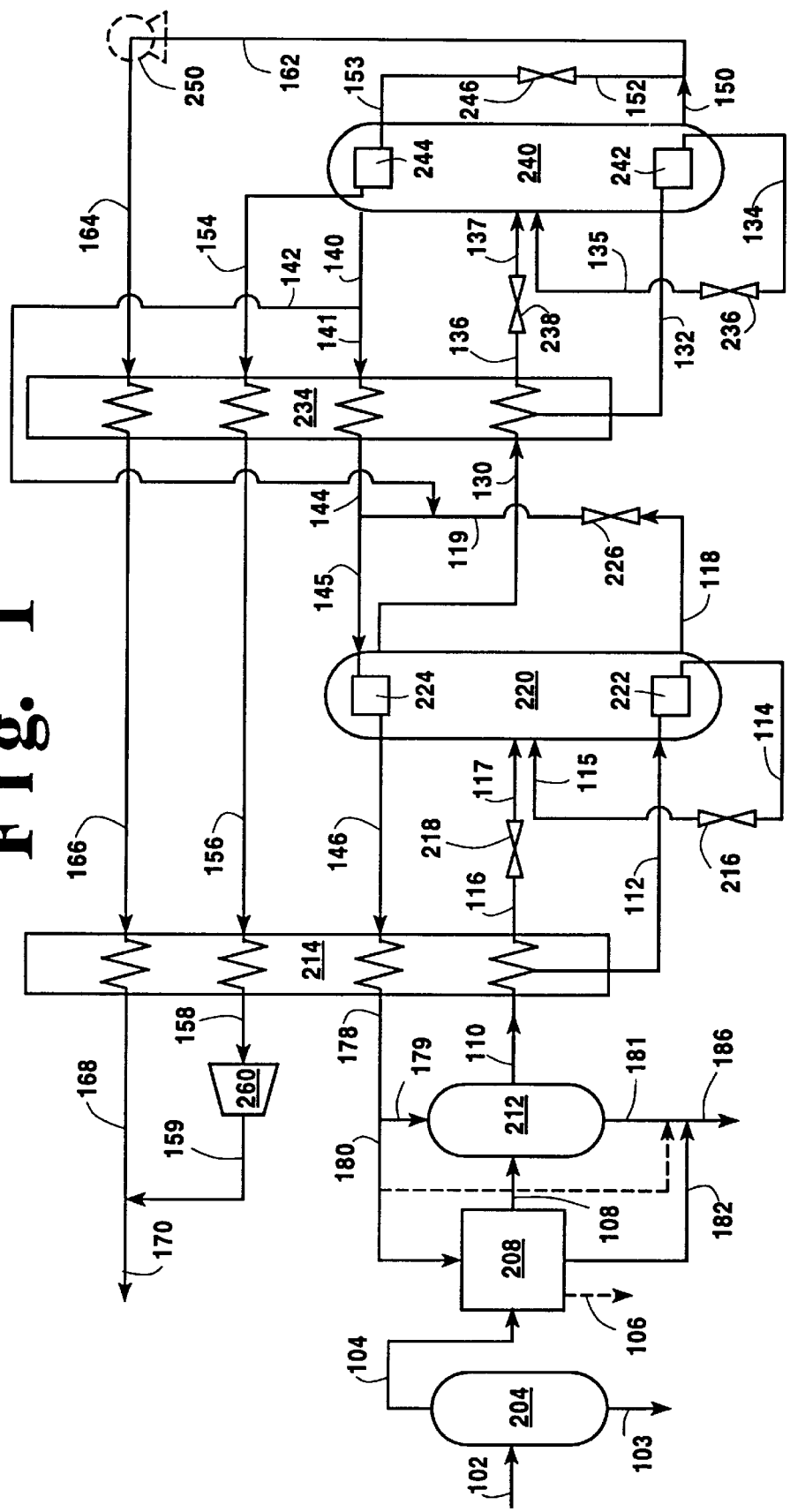
FIG. 1 is a schematic representation of one preferred embodiment of the invention wherein the carbon dioxide removal system is a chemical absorption system, which is particularly useful when the feed has a relatively high concentration of carbon dioxide, and wherein high purity methane is produced in addition to the fuel.

The invention will be described in greater detail with reference to the Drawings. Referring now to FIG. 1 feed 102 at a pressure generally within the range of from 150 to 600 pounds per square inch absolute (psia) is introduced into separator 204 from which any liquids within stream 102 are removed in stream 103. Gaseous feed 104 comprising nitrogen, methane and carbon dioxide is passed to carbon dioxide removal system 208. Typically the feed comprises from 2 to 85 volume percent nitrogen, from 15 to 95 volume percent methane, and from 1 to 40 volume percent carbon dioxide on a dry basis. Other species which may be present in feed stream 104 include heavier hydrocarbons such as ethane and propane.

Carbon dioxide removal system 208 is shown in representational form. It is a hot potassium carbonate system which is particularly useful when the carbon dioxide concentration in feed 104 is within the range of from 3 to 40 volume percent. The hot potassium carbonate system comprises an absorber tower wherein hot potassium carbonate solution is contacted with feed to absorb carbon dioxide. The carbon dioxide loaded absorbent may be regenerated by heating and in addition by stripping using a portion of the fuel product as the stripping gas, as will be further discussed below. The regenerated absorbent is then recycled to the absorber tower.

Carbon dioxide depleted feed is withdrawn from carbon dioxide removal system 208 in stream 108 having a carbon dioxide concentration generally within the range of from 0.05 to 1.0 volume percent, and is passed to dryer 212 wherein any moisture within the carbon dioxide depleted feed is removed, generally by adsorption onto adsorbent particles. Resulting dried carbon dioxide depleted feed 110 is passed to heat exchanger 214 wherein it is cooled by indirect heat exchange with return streams. A portion 112 of stream 110 is withdrawn from heat exchanger 214 after partial traverse and passed into bottom reboiler 222 of upstream column 220 wherein it is further cooled and may be partially condensed by indirect heat exchange with column 220 bottom liquid. Resulting fluid 114 is passed through valve 216 and then as stream 115 into column 220. The remaining portion 116 of stream 110 is further cooled by completing the traverse of heat exchanger 214. The resulting further cooled stream which may be partially condensed is passed through valve 218 and as stream 117 is passed into column 220.

Column 220 is operating at a pressure generally within the range of from 145 to 595 psia. Within column 220 the carbon dioxide depleted feed is separated by rectification into a bottom liquid and into a top vapor. The bottom liquid, which comprises heavier hydrocarbons and carbon dioxide as well as some methane, is withdrawn from the lower portion of column 220 in stream 118, passed through valve 226 and as stream 119 combined with other streams for further processing as will be described below. Top vapor is withdrawn from the upper portion of column 220 as carbon dioxide depleted feed 130 and is then further cooled to the requisite cryogenic temperature. Stream 130 comprises mostly nitrogen and methane and may contain small amounts of carbon dioxide and ethane.

Carbon dioxide depleted feed 130 is passed to heat exchanger 234 wherein it is cooled by indirect heat exchange with return streams. A portion 132 of stream 130 is withdrawn from heat exchanger 234 after partial traverse and passed into bottom reboiler 242 of cryogenic rectification column 240 wherein it is further cooled and partially condensed by indirect heat exchange with column 240 bottom liquid. Resulting fluid 134 is passed through valve 236 and then as stream 135 into cryogenic rectification column 240. The remaining portion 136 of stream 130 is further cooled and partially condensed by completing the traverse of heat exchanger 234. The resulting further cooled stream is passed through valve 238 and as stream 137 is passed into column 240.

Cryogenic rectification column 240 is operating at a pressure generally within the range of from 20 to 400 psia. Within cryogenic rectification column 240 the cooled carbon dioxide depleted feed is separated by cryogenic rectification into fuel and high purity methane. High purity methane is withdrawn from the lower portion of column 240 in liquid stream 150. A portion 162 of stream 150 is optionally pumped to a higher pressure by means of pump 250 and then passed as stream 164 to heat exchanger 234 wherein it is vaporized. Resulting stream 166 is further warmed by passage through heat exchanger 214 and withdrawn as stream 168 for recovery. The other portion 152 of stream 150 is reduced in pressure by passage through valve 246 and lower pressure liquid stream 153 is passed into top condenser 244 wherein it is vaporized thus serving to provide by indirect heat exchange reflux liquid for column 240. Resulting vapor 154 is warmed by passage through heat exchanger 234 and resulting stream 156 further warmed by passage through heat exchanger 214. The resulting warmed stream 158 is increased in pressure by passage through compressor 260 and resulting compressed stream 159 is combined with stream 168 to form stream 170 for recovery as high purity methane product.

Fuel is withdrawn from the upper portion of cryogenic rectification column 240 in stream 140 for recovery. A first portion 141 of stream 140 is warmed by indirect heat exchange in heat exchanger 234 and withdrawn as stream 144. A second portion 142 of stream 140 bypasses heat exchanger 234. Streams 144 and 142 are combined with stream 119 which has been flashed by passage through valve 226 to form mixed phase stream 145 and passed into top condenser 224. Stream 145 is warmed and vaporized in top condenser 224 by indirect heat exchange with rising vapor with column 220 to produce reflux liquid for column 220. Resulting warmed fuel stream 146 is passed from condenser 224 through heat exchanger 214 wherein it is further warmed and from which it is withdrawn as stream 178. A portion 179 of fuel stream 178 is used to regenerate dryer 212 and is removed in stream 181 containing water vapor in addition to the methane and nitrogen. The remaining portion 180 of stream 178 may be recovered as shown by the dotted line or may be passed to the stripping tower of the hot potassium carbonate system to regenerate the potassium carbonate solution, emerging therefrom as carbon dioxide containing fuel stream 182. Streams 181 and 182 or 180 are combined to form product fuel stream 186.

Figure 2:
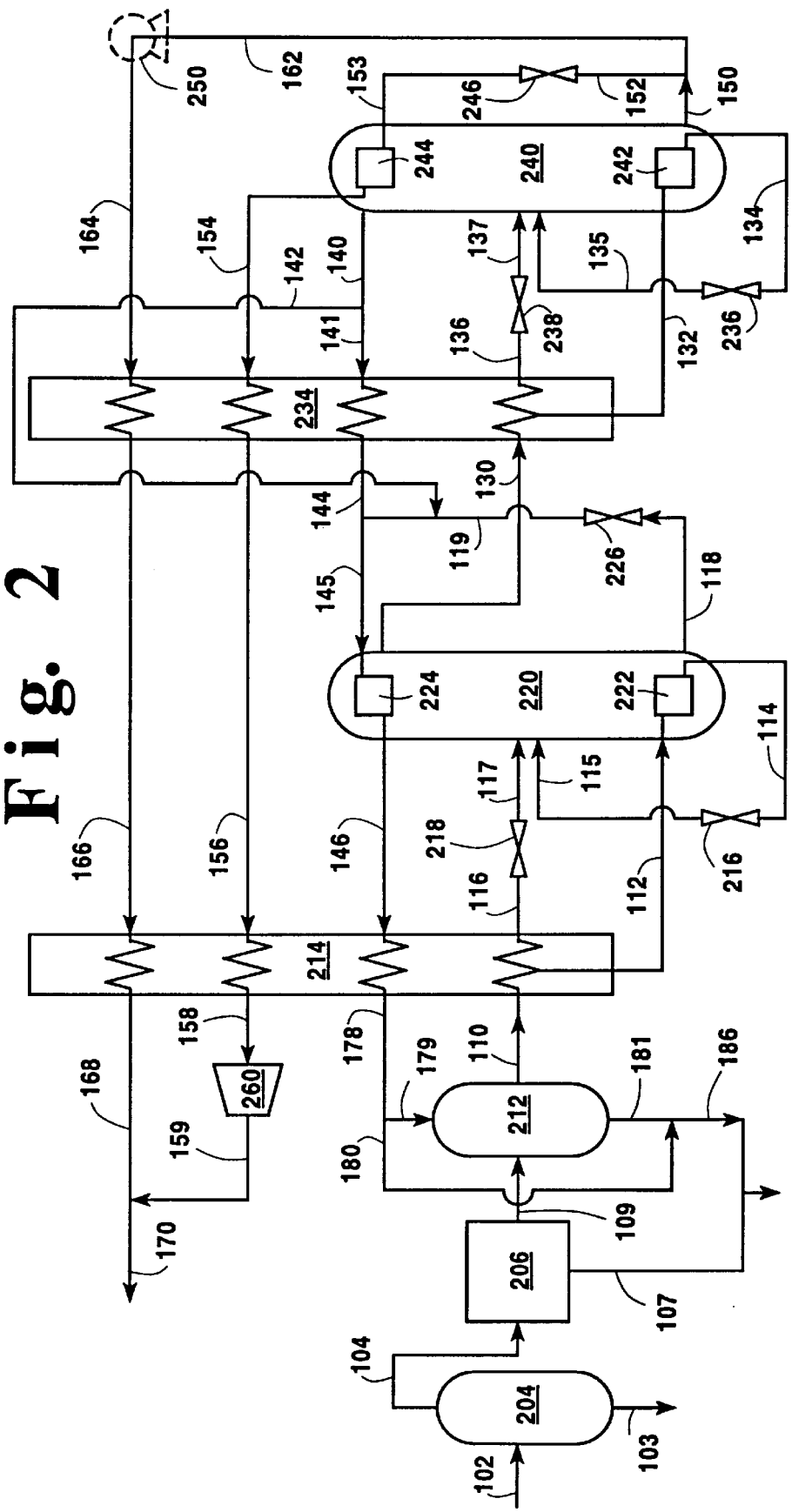
FIG. 2 is a schematic representation of another preferred embodiment of the invention wherein the carbon dioxide removal system is a membrane separation system, which is particularly useful when the feed has a relatively low concentration of carbon dioxide, and wherein high purity methane is produced in addition to the fuel.

FIG. 2 illustrates another embodiment of the invention which is particularly useful when the carbon dioxide concentration of the feed is within the range of from 1 to 4 volume percent. The carbon dioxide removal system employed with the embodiment illustrated in FIG. 2 is a membrane separation unit. The numerals of FIG. 2 are the same as those of FIG. 1 for the common elements and these common elements will not be described again in detail.

Referring now to FIG. 2, feed 104 is passed to membrane separator 206 which comprises a membrane which has high selectivity for carbon dioxide over both methane and nitrogen. Carbon dioxide and water vapor permeate through the membrane and are removed from separator 206 in permeate stream 107 at a pressure generally within the range of from 15 to 25 psia. Stream 107 will generally also contain some methane and thus may be passed into fuel stream 186 as shown in FIG. 2. Retentate stream 109 is passed as carbon dioxide depleted feed to dryer 212 for further processing as previously described.

Where the feed does not contain a significant amount of heavier hydrocarbons, or where high purity natural gas rather than high purity methane is desired in addition to the fuel, the upstream rectification column 220 need not be employed and the carbon dioxide depleted feed may be passed directly from the carbon dioxide removal system, after the cooling step, to the cryogenic rectification column.

Figure 3:
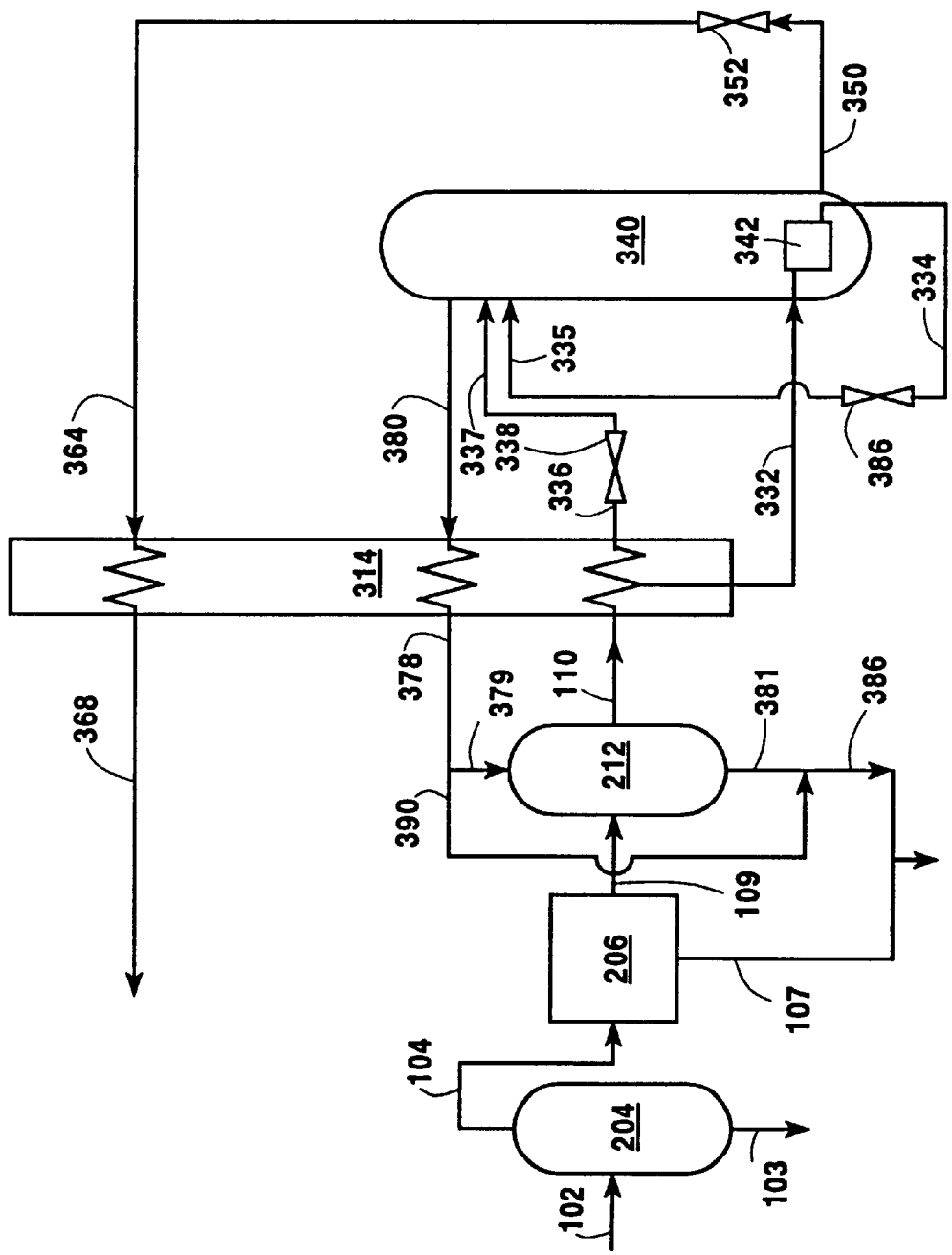
FIG. 3 is a schematic representation of another preferred embodiment of the invention wherein high purity natural gas is produced in addition to the fuel.

FIG. 3 illustrates one such embodiment wherein high purity natural gas is produced in addition to the fuel. The numerals of FIG. 3 are the same as those of FIG. 2 for the common elements and these common elements will not be discussed again in detail. Referring now to FIG. 3, the dried carbon dioxide depleted feed 110 is passed to heat exchanger 314 wherein it is cooled by indirect heat exchange with return streams. A portion 332 of stream 110 is withdrawn from heat exchanger 314 after partial traverse and passed into bottom reboiler 342 of cryogenic rectification column 340 wherein it is further cooled and partially condensed by indirect heat exchange with column 340 bottom liquid. Resulting fluid 334 is passed through valve 386 and then as stream 335 into cryogenic rectification column 340. The remaining portion 336 of stream 110 is further cooled and partially condensed by completing the traverse of heat exchanger 314. The resulting further cooled stream is passed through valve 338 and as stream 337 is passed into column 340.

Cryogenic rectification column 340 is operating at a pressure generally within the range of from 20 to 400 psia. Within cryogenic rectification column 340 the cooled carbon dioxide depleted feed is separated by cryogenic rectification into fuel and high purity natural gas, typically containing up to about 95 mole percent methane with the remainder comprised essentially of hydrocarbons having 2 or more carbon atoms such as ethane and propane, i.e. heavier hydrocarbons.

High purity natural gas is withdrawn from the lower portion of column 340 in liquid stream 350, passed through valve 352, and then passed as stream 364 to heat exchanger 314 wherein it is warmed and preferably vaporized. Resulting stream 368 is withdrawn from heat exchanger 314 and recovered. Fuel is withdrawn from the upper portion of cryogenic rectification column 340 in stream 380 for recovery. Stream 380 is warmed by indirect heat exchange in heat exchanger 314 and withdrawn as stream 378. A portion 379 of fuel stream 378 is used to regenerate dryer 212 and is removed in stream 381 containing water vapor in addition to methane and nitrogen. The remaining portion 390 of stream 378 is recovered directly, as shown in FIG. 3, by combination with stream 381 to form stream 386. If desired stream 107 may also be combined with stream 386 for recovery.

Although the invention has been described in detail with reference to certain preferred embodiments, those skilled in the art will recognize that there are other embodiments of the invention within the spirit and the scope of the claims.

What is claimed is:
1. A process for the production of fuel and high purity hydrocarbon product comprising:
 (A) providing a feed comprising nitrogen, methane and carbon dioxide wherein carbon dioxide comprises from 1 to 40 volume percent of the feed;
 (B) removing carbon dioxide from the feed to produce a carbon dioxide depleted feed;
 (C) cooling the carbon dioxide depleted feed and passing the cooled carbon dioxide depleted feed into a cryogenic rectification column;
 (D) separating the carbon dioxide depleted feed by cryogenic rectification within the cryogenic rectification column into fuel and high purity hydrocarbon product; and
 (E) recovering fuel from the upper portion of the cryogenic rectification column, and recovering high purity hydrocarbon product from the lower portion of the cryogenic rectification column.

2. The method of claim 1 wherein the high purity hydrocarbon product is high purity methane.

3. The method of claim 1 wherein carbon dioxide is removed from the feed by contacting the feed with hot potassium carbonate and absorbing carbon dioxide from the feed into the hot potassium carbonate.

4. The method of claim 1 wherein carbon dioxide is removed from the feed by passing the feed through a membrane separator and selectively permeating carbon dioxide from the feed through the membrane of the membrane separator.

5. The method of claim 1 wherein the feed contains one or more additional hydrocarbon species having 2 or more carbon atoms and wherein the carbon dioxide depleted feed undergoes rectification for removal of hydrocarbons having two or more carbon atoms prior to passage into the cryogenic rectification column.

6. Apparatus for the production of fuel and high purity hydrocarbon product comprising:
 (A) a carbon dioxide removal system and means for providing a feed comprising nitrogen, methane and carbon dioxide to the carbon dioxide removal system;
 (B) heat exchange means, and means for passing carbon dioxide depleted feed from the carbon dioxide removal system to the heat exchange means;
 (C) a cryogenic rectification column and means for passing carbon dioxide depleted feed from the heat exchange means to the cryogenic rectification column;
 (D) means for recovering fuel from the upper portion of the cryogenic rectification column; and
 (E) means for recovering high purity hydrocarbon product from the lower portion of the cryogenic rectification column.

7. The method of claim 1 wherein the high purity hydrocarbon product is high purity natural gas.

8. The method of claim 7 wherein carbon dioxide is removed from the feed by contacting the feed with hot potassium carbonate and absorbing carbon dioxide from the feed into the hot potassium carbonate.

9. The method of claim 7 wherein carbon dioxide is removed from the feed by passing the feed through a membrane separator and selectively permeating carbon dioxide from the feed through the membrane of the membrane separator.

10. The method of claim 7 wherein the feed contains one or more additional hydrocarbon species having 2 or more carbon atoms and wherein the carbon dioxide depleted feed undergoes rectification for removal of hydrocarbons having two or more carbon atoms prior to passage into the cryogenic rectification column.

* * * * *